United States Patent [19]

Hoshi et al.

[11] Patent Number: 5,329,516
[45] Date of Patent: Jul. 12, 1994

[54] DISK PLAYER WITH INTERNAL CONVEYOR FOR EXCHANGING STORED DISKS

[75] Inventors: Masayuki Hoshi; Masashi Tanabe, both of Saitama, Japan

[73] Assignee: Pioneer Electronic Corporation, Tokyo, Japan

[21] Appl. No.: 911,580

[22] Filed: Jul. 10, 1992

[30] Foreign Application Priority Data

Nov. 8, 1991 [JP] Japan ................................ 3-321170
Nov. 8, 1991 [JP] Japan ................................ 3-321171

[51] Int. Cl.⁵ ........................................... G11B 33/02
[52] U.S. Cl. ................................ 369/77.1; 369/75.1; 369/36
[58] Field of Search ................ 369/77.1, 75.1, 258, 369/36; 360/98.01

[56] References Cited

U.S. PATENT DOCUMENTS

| | | | |
|---|---|---|---|
| 4,302,832 | 11/1981 | Cheeseboro | 369/77.1 |
| 4,607,354 | 8/1986 | Ishibashi et al. | |
| 4,680,748 | 7/1987 | Kobayashi | |
| 4,718,112 | 1/1988 | Shinoda | |
| 4,742,508 | 5/1988 | Lee et al. | |
| 4,815,056 | 3/1989 | Toi et al. | |
| 4,817,071 | 3/1989 | Carlson et al. | |
| 4,839,758 | 6/1989 | Honjoh | |
| 4,896,228 | 1/1990 | Amakasu et al. | 360/98.01 |
| 4,954,918 | 9/1990 | Shiosaki | |
| 4,989,195 | 1/1991 | Suzuki | |
| 5,025,431 | 6/1991 | Naito | 369/36 |
| 5,036,503 | 7/1991 | Tomita | |
| 5,043,962 | 8/1991 | Wanger et al. | |
| 5,043,963 | 8/1991 | Iwamoto | 369/36 |
| 5,051,973 | 9/1991 | Shiba et al. | 369/36 |
| 5,105,414 | 4/1992 | Funabashi et al. | 369/77.1 |
| 5,157,646 | 10/1992 | Amemiya et al. | 369/36 |
| 5,204,850 | 4/1993 | Obata | 369/75.1 |

FOREIGN PATENT DOCUMENTS

| | | |
|---|---|---|
| 0139327 | 5/1985 | European Pat. Off. . |
| 8601326 | 2/1986 | European Pat. Off. . |
| 0183554 | 6/1986 | European Pat. Off. . |
| 0200706 | 11/1986 | European Pat. Off. . |
| 0265167 | 4/1988 | European Pat. Off. . |
| 0273734 | 7/1988 | European Pat. Off. . |
| 0284445 | 9/1988 | European Pat. Off. . |
| 0351470 | 1/1990 | European Pat. Off. . |
| 0386913 | 9/1990 | European Pat. Off. . |
| 0391424 | 10/1990 | European Pat. Off. . |
| 0418040 | 3/1991 | European Pat. Off. . |
| 0446409 | 9/1991 | European Pat. Off. . |
| 3908840 | 9/1989 | Fed. Rep. of Germany . |
| 3386966 | 4/1991 | Japan . |

OTHER PUBLICATIONS

Proceedings of Spie-The International Society for Optical Engineering, vol. 695, Aug. 1986, pp. 412–420.
Patent Abstracts of Japan vol. 14, No. 581 (P-1147) Dec. 26, 1990 (JPA 22 49 174).

Primary Examiner—Edward K. Look
Assistant Examiner—Mark Sgantzos
Attorney, Agent, or Firm—Sughrue, Mion, Zinn, Macpeak & Seas

[57] ABSTRACT

A disk player which is capable of attaining a higher speed in its start-up for sound reproduction, in which at the time of the reproduction of a disk, the pickup moves to the starting position of the reproduced side for the disk to be reproduced after the specified side of the disk is determined when the disk number, the disk size, and the music piece number are specified. Even in case the side B of a disk has been specified, the present invention makes it possible for a disk player promptly to perform the start-up operation of each disk. Even in case any of CDs and LDs different in type is stored, the present invention enables a disk player promptly to perform the start-up operation for such a disk.

9 Claims, 9 Drawing Sheets

| POINT a | POINT b | |
|---|---|---|
| 1 | 1 | VIDEO DISK (LD) |
| 1 | 0 | COMPACT DISK (CD) |
| 0 | 0 | NO DISK |

DISK PLAYER WITH INTERNAL CONVEYOR FOR EXCHANGING STORED DISKS

BACKGROUND OF THE INVENTION

The present invention relates to a disk player having an automatic changing function consisting of storing a plural number of disks respectively different in diameter, such as compact disks (hereinafter referred to as "CD") and video disks (hereinafter referred to as "LD") and automatically loading and reproducing a selected disk. More particularly, the present invention relates to a disk player which makes it possible to attain a higher speed in the start-up of a reproducing operation by controlling the position of the pickup according to a reproduction side or a type of the selected disk.

In a laser disk reproducing system for playing music without a song for accompaniment of singing (KARAOKE system), a considerably experienced specialized operator is needed for finding requested music pieces one after another in rapid succession and setting a proper disk in a disk player. An automatic changing function can be a substitute for such a specialized operator.

RELATED ART OF THE INVENTION

Figure 1:
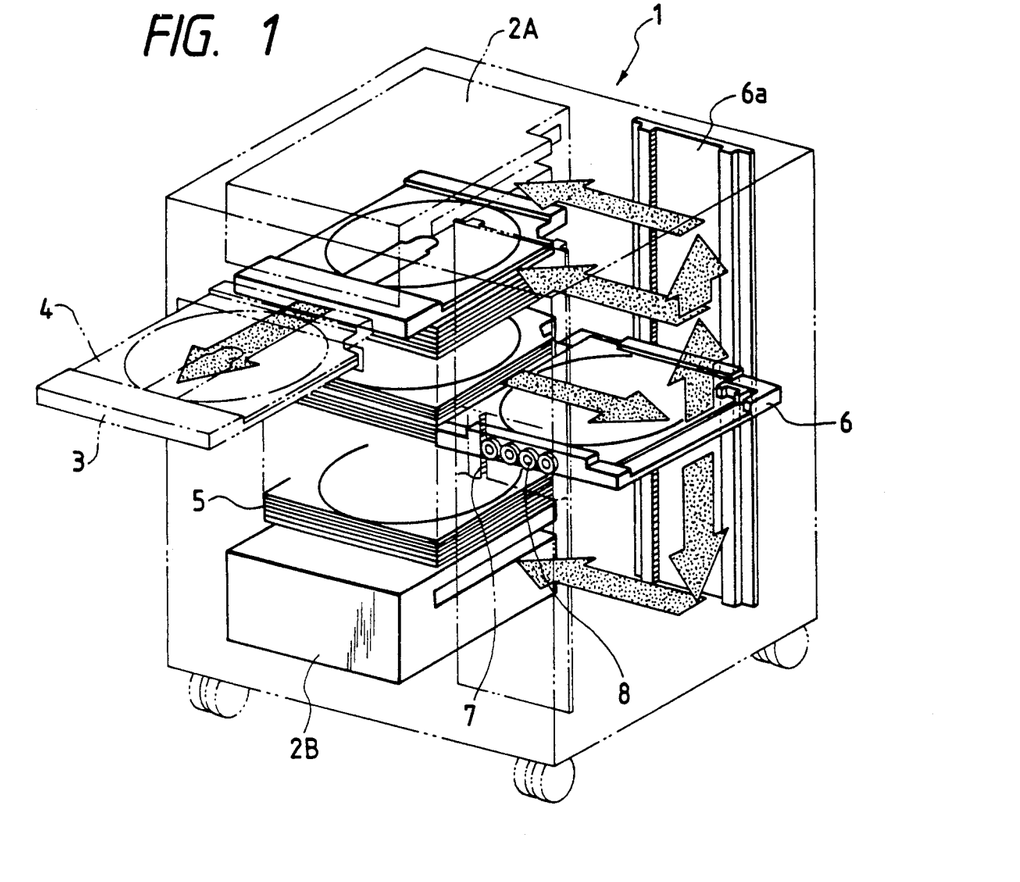
FIG. 1 is a perspective view illustrating one example of the construction of a conventional disk player.

A disk player like the one shown in FIG. 1 is described, for example, in U.S. patent application Ser. No. 07/860,033 filed on Mar. 30, 1992 as a disk player having such an automatic changing function.

The disk player has two disk reproducing parts 2A and 2B provided in the upper and lower areas on one side of the inside region of a housing 1. The disk player is provided also with a main tray 3 formed in an upper end part of the housing 1 in such a manner that the main tray 3 may be freely drawn out. In case the main tray 3 is pulled into the inside region of the housing 1, the main tray 3 is accommodated in an area under the lower surface of the disk reproducing part 2A formed at an upper level.

The main tray 3 is provided with a sub-tray 4, which is formed in such a way as to be capable of moving freely in the direction crossing the moving direction of this main tray 3 at right angles. A sub-tray storing part 5, which stores a sub-tray 4 holding a disk therein or an empty sub-tray 4 in such a way as to permit the sub-tray 4 freely to move forward or backward in the horizontal direction and to be stored in the layers.

At the other side of the inside region of the housing 1, a space is provided to allow movement of a transporting member 6, which transports a sub-tray 4 between a disk reproducing part 2A and another disk reproducing part 2B positioned above and below therein. The transporting member 6 moves in the upward and downward directions along a guide member 6a when a driving force is applied to it from a moving mechanism having a rack 7, a pinion 8, and so forth.

The positioning of the transporting member 6 in the upward and downward directions along the guide member 6a is effected by counting a plural number of slits (not shown in the drawings) formed in a member, which is arranged to extend parallel to the direction of movement of the transporting member 6, at each time when a photo-sensor (not shown in the drawings) provided on the transporting member 6 passes across each such slit. The transporting member 6 is stopped at a point in time when the count value thus obtained agrees with a specified address.

Figure 2:
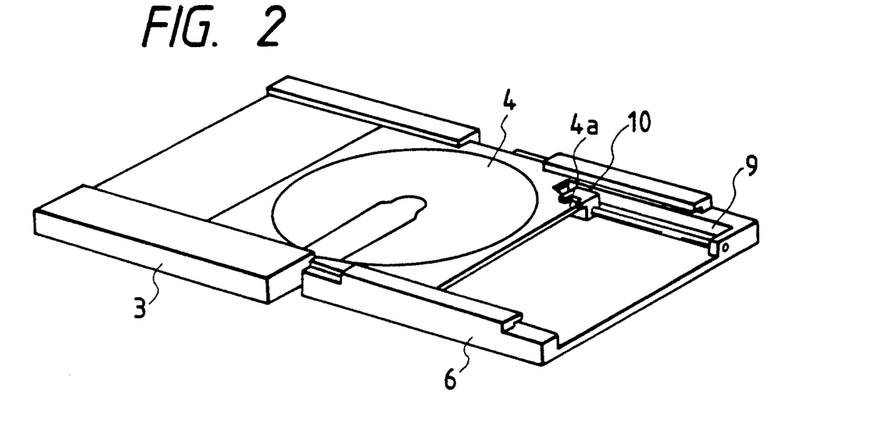
FIG. 2 is a perspective view illustrating a description of the state of reception and delivery by the transporting member shown in FIG. 1.

The transporting member 6 is provided with an engaging member 10, as shown in FIG. 2, and this engaging member 10 moves in the horizontal direction along the guide member 9. When a sub-tray 4 is, for example, to be drawn out of the main tray 3, the engaging member 10 moves toward the main tray 3 and engages itself with an engaging projection 4a of the sub-tray 4. In this state, the engaging member 10 moves away from the main tray 3, and the sub-tray 4 is thereby pulled into the side of the transporting member 6. In case a sub-tray 4 is to be relocated from the side of the transporting member 6 to that of the main tray 3, the transporting member 6 pushes the sub-tray 4 towards the side of the main tray 3 while the engaging member 10 is in its state of being engaged with the engaging projection 4a. When the sub-tray 4 has been completely relocated to the side of the main tray 3, the engaging projection 4a is released from the engaging member 10. After this, the engaging member 10 moves away from the main tray 3.

A disk player constructed as described above is operated by operating keys (not shown in the drawings) on an operating panel provided on the surface of the housing 1 or by operating keys (not shown in the drawings) on a remote control unit (hereinafter referred to as "RC unit"). For example, when the disk player is instructed to eject the main tray 3, the main tray 3 in its state of being loaded with a sub-tray 4 is pushed out of the housing 1. When a loading instruction is given by selection of the operating keys mentioned above while a disk is placed on a sub-tray 4, the main tray 3 is pulled into the housing 1.

Upon completion of the operation for drawing the main tray 3 into the housing 1, the transporting member 6 moves along the guide member 6a and reaches the position of the main tray 3. The sub-tray 4 at the side of the main tray 3 will then be pulled into the side of the transporting member 6 by the action of the engaging member 10.

The transporting member 6, which has thus received a sub-tray 4, moves towards either one of the disk reproducing parts 2A and 2B. Upon completion of this movement of the transporting member 6, the sub-tray 4 is removed from the transporting member 6 and pushed into the inside of either the disk reproducing part 2A or the disk reproducing part 2B by the action of the engaging member 10, and the reproduction of the disk is then performed.

Moreover, in case the other of the disk reproducing part 2A and the disk reproducing part 2B is empty, the disk player can also perform continuous reproduction of disks by transporting another sub-tray 4 stored in the sub-tray storing part 5 in the same manner as that described above by means of the transporting member 6 and keeping the sub-tray 4 loaded with a disk in its stand-by state at the side of the other disk reproducing part, namely 2A or 2B. The disk player can perform continuous reproduction of disks also by moving an empty sub-tray 4 stored in the sub-tray storing part 5 to the main tray 3 by means of the transporting member 6, ejecting the main tray 3 again, loading a new disk on the sub-tray 4 on the main tray 3, and thereafter loading the sub-tray 4 on the main tray 3 in the same manner as described above, and then keeping the loaded main tray 3 in its stand-by state at the side of the other disk reproducing part, namely, 2A or 2B.

In other words, the sub-tray 4 which held the disk which is currently being reproduced has been transported into the inside region of the disk reproducing part 2A or the disk reproducing part 2B, and the transporting member 6 is therefore in its empty state without any sub-tray 4 loaded on it. On the other hand, the individual sub-trays 4 which are stored in the sub-tray storing part 5 are arranged vertically and, in keeping with this arrangement, the engaging projections 4a of the individual sub-trays 4 are arranged in their vertical positions.

In conformity with this vertical arrangement, the transporting member 6 moves in the upward and downward directions, stops once in the position corresponding to a specified sub-tray 4 stored in the sub-tray storing part 5, and can pull out and receive the sub-tray 4 from the sub-tray storing part 5 in the same manner of operation as described above and can also transport the received sub-tray 4 into an empty disk reproducing part, namely, 2A or 2B in the same manner of operation as described above.

In this regard, the engaging projection 4a provided on a sub-tray 4 projects in the direction of movement of the main tray 3, and the upward and downward movement of the transporting member 6 and the horizontal movement of the main tray 3, therefore, will not influence each other. For example, the disk player is capable of performing its operations for the ejection and loading of the main tray 3 even in the midst of an upward or downward movement which the transporting member 6 performs in order to access a specified sub-tray 4 in the sub-tray storing part 5.

The exchanging of a disk loaded on a sub-tray 4 stored in the sub-tray storing part 5 is performed in the manner described below.

When the operator selects operating keys provided on the above-mentioned operating panel or on an RC unit in order to specify a disk replacing mode and then selects operating keys for specifying the address of the sub-tray 4 to be replaced, the transporting member 6 will pull the sub-tray 4 out of the main tray 3 where it is currently stored and will transport the sub-tray 4 for its relocation to a stand-by position provided in a position other than the sub-tray storing part 5 (which may be an empty disk reproducing part, namely, 2A or 2B, for example). This operation puts the main tray 3 into its empty state. Then, the transporting member 6 moves to the position of the sub-tray 4 in the sub-tray storing part 5 corresponding to the specified address, where the transporting member 6 receives the sub-tray 4 from the sub-tray storing part 5 in the same operating manner as that described above. The transporting member 6 when loaded with the sub-tray 4 moves upward to the side of the main tray 3 and delivers the sub-tray 4 to the main tray 3.

When the main tray 3 has received a sub-tray 4, the disk player shifts to the ejecting mode, in which the main tray 3 is pushed out to the outside of the housing 1. When a loading instruction is given to the disk player after the disk is replaced while the disk player is in an ejecting mode, the main tray 3 will be loaded into a predetermined position in the inside region of the housing 1. When the loading of the main tray 3 has been completed, the transporting member 6 receives the sub-tray 4 and returns the sub-tray 4 to its original position in the sub-tray storing part 5. As the main tray 3 is in its empty state at this point in operation, the transporting member 6 will relocate the sub-tray 4 into the main tray 3 from the stand-by position (namely, either the disk reproducing part 2A or the disk reproducing part 2B) where the sub-tray 4 is currently held.

In this manner, the disk player repeats the operations mentioned above when the operator simply operates proper operating keys provided on the operating panel or on the RC unit mentioned above, thereby specifying the disk number, the disk side, and the music piece number in regular sequence.

Moreover, a disk player constructed as described above is capable of replacing a disk stored in the sub-tray storing part 5, by performing operations for the ejection, loading, and so forth of the main tray 3, and therefore eliminates the necessity of replacing a disk on a sub-tray 4 by manual operations, including the operation for opening the door of the housing 1, which are required of the operator in the operation of a conventional disk player. Thus, the disk player as described above also offers the advantage that it is capable of storing a specified disk in a position corresponding to a specified address.

Now, it is desired that a business-use laser disk player system for reproducing a music piece music for accompaniment without any prerecorded vocal song will attain as high a speed as possible in terms of its access time (i.e., the duration of time needed for locating the beginning of a music piece) in order that such a disk player may succeed in reproducing an accompanying music piece without keeping the singer waiting for it and that the disk player may thereby improve its efficiency for business operation. For this reason, a conventional disk player having the automatic changing function mentioned above is constructed in such a manner that it is, for example, provided with two disk reproducing parts 2A and 2B and that a disk to be reproduced next is kept in its stand-by state in one of the disk reproducing parts, namely, 2B, while the other disk reproducing part 2A is being operated for the reproduction of another disk. Moreover, a construction like the one just mentioned is employed generally.

Yet, in case such a disk player is provided with a plural number of disk reproducing parts 2A and 2B in this manner, it is required that a sensor for detecting the type of a disk should be installed on each of the disk reproducing parts 2A and 2B. This requirement results in the disadvantage that such a construction entails not only a greater complication of its structure but also an increase in its cost.

In this regard, it is found that the disks from which information can be reproduced by means of an optical pickup include CDs having a diameter of 8 cm or 12 cm and LDs having a diameter of 20 cm or 30 cm. The so-called compatible type disk players are capable of reproducing recorded disks different diameters as mentioned above. In such disk players, a detecting means for its detection of the type of a disk are required because the starting position of a record is different from one disk to another. That is the starting position of a record on a CD is located radially closer to the center of the CD than the starting position of a record on an LD. For such, a means of detecting the type of disk, a detecting means operating by focus lock-in or a photosensor is employed.

Figure 3:
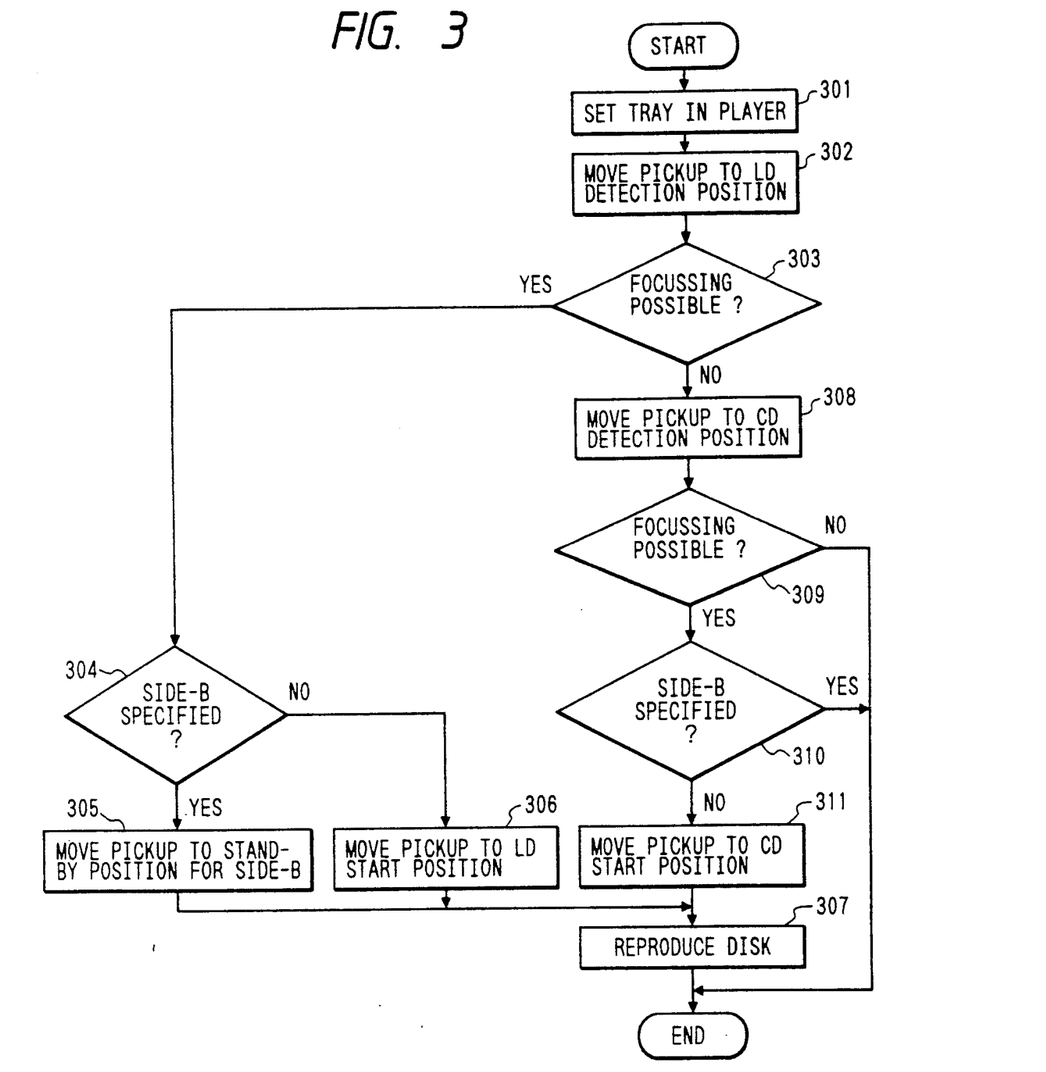
FIG. 3 is a flow chart for illustrating a description of the focus lock-in operation as an example of a conventional process for determining the type of a disk.

In the discrimination of a disk by the focus lock-in method, a sub-tray 4 is first set either in the disk reproducing part 2A or in the disk reproducing part 2B (at the step 301), and then the pickup will be moved to a point larger in radius than 6 cm but smaller in radius than 10 cm (at the step 302), as shown in FIG. 3, and a focus detecting operation is performed in the located position (at the step 303). In case a lock-in operation is achieved, it is determined that the disk set for reproduction in the sub-tray 4 is an LD, and the pickup is moved to the starting position for the LD (at the step 306 and performs the reproduction of the disk (at the step 307).

On the other hand, if a lock-in operation is not achieved in that position, the pickup will then be moved to a position smaller than 4 cm in radius (at the step 308), and a focus detecting operation is performed again in that position (at the step 309). In case a focus lock-in is attained, it is determined that the disk is a CD, and the pickup is then moved to the starting position for a CD (at the step 311), and the reproduction of the disk is performed (at the step 307).

In case a failure in the lock-in operation occurs (at the step 309), it is determined that there is no disk on the sub-tray 4, with the result that a message reading, for example, "NO DISK" is indicated on the display part.

However, disk discrimination by the focus lock-in method requires a series of sequential operations, which consist of the steps of performing a focus detecting operation in the position where a focus is to be found of the CD in case it is not possible to attain any focus lock-in at the position where the focus of an LD is to be found. Thus, this method of discriminating the type of a disk has the disadvantage that it takes too long a time before the performance of a specified music piece can be started after instructions are given on the disk number and disk side of the disk to be played back for reproduction and the music piece number on the disk, in case this disk discriminating method is applied to a disk player provided with an automatic changing function working for storing a plural number of disks different in diameter and automatically loading a selected disk for its reproduction.

Particularly in a disk player constructed in such a way that a single pickup in one disk reproduction part is to perform its reproducing operation on the side A and side B of a disk, the pickup is moved between the side A and side B of the disk, and the duration of time needed for such a pickup movement itself is long, and, what is more, the duration of time needed for the pickup movement is added onto the duration of time needed for starting the reproduction of the specified music. For this reason, this type of disk player shows a distinct shortcoming that it takes too long a period of time before it can start its reproduction of the specified piece of music.

Figure 4:
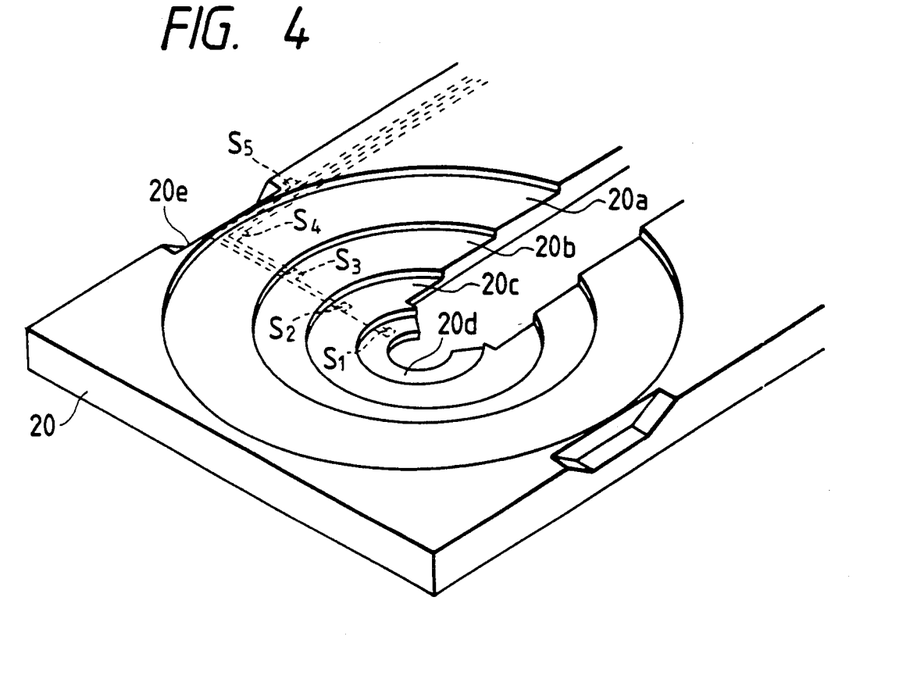
FIG. 4 is a perspective view illustrating a loading device employing sensors as another example of the conventional means of discriminating the type of a disk.

On the other hand, a means of detecting the type of a disk by using a photo-sensor is found in the loading device shown in FIG. 4, which is cited from the Unexamined Japanese Patent Publication (Kokai) Hei-3-86966. The loading device operates with a tray 20, which is provided with a staged part 20a for mounting an LD having a diameter of 30 cm, a staged part 20b for mounting an LD having a diameter of 20 cm, a staged part 20c for mounting a CD having a diameter of 12 cm, and a staged part 20d for mounting a CD in a diameter of 8 cm. A through hole (omitted from illustrations in the drawings) is formed in each of the staged parts marked 20a through 20d. Sensors S1, S2, S3, and S4, which are comprised of photo-couplers or mechanical switches, are installed in the lower end parts of the individual through holes.

Also, a through hole is made in the horizontal direction in the outermost circumference of the tray 20, and a sensor S5, which is identical to the sensors mentioned above, is installed in the farthest end of this through hole. Moreover, this sensor S5 is designed specifically to operate without any error when external light such as lighting is extinguished in case the sensors S1 through S4 are optical sensors, and this sensor S5 is therefore set in a position in which the sensor S5 is not obstructed by a disk.

Moreover, in case the individual sensors S1 through S5 are mechanical sensors, it is determined that the detected disk is a CD having a diameter of 8 cm when the sensor S1 is turned ON, that the detected disk is a CD having a diameter of 12 cm when the sensor S2 is turned ON, that the detected disk is an LD having a diameter of 20 cm when the sensor S3 is turned ON, and that the detected disk is an LD having a diameter of 30 cm when the sensor S4 is turned ON, but it is determined that there is no disk in place when all of the individual sensors S1 through S5 are turned OFF.

Furthermore, in case the individual sensors S1 through S5 are optical sensors, it is determined that the detected disk is a CD having a diameter of 8 cm when only the sensor S1 is turned ON, that the detected disk is a CD having a diameter of 12 cm when both the sensor S1 and the sensor S2 are turned ON, that the detected disk is an LD having a diameter of 20 cm when the sensors S1 through S3 are turned on, and that the detected disk is an LD in a diameter of 30 cm when all of the sensors S1 through S4 are turned ON, but it is determined that there is no disk in place when all of the sensors S1 through S5 are turned OFF.

However, if a tray like tray 20 were to be applied to a disk player shown in FIG. 1 which sets a prerequisite condition for the present application, the individual sensors S1 through S5 would be necessary for their installation in the tray 20 for every sub-tray 4, and this would mean that not only a practically unlimited number of sensors would be needed, but also correspondingly many control lines to be connected with these sensors would be necessary, and such a construction would present the problem that the number of items of the component parts would be increased to an excessively large number.

SUMMARY OF THE INVENTION

The present invention has been made in an effort to deal properly with these circumstances, and it is accordingly an object of the present invention to provide a disk player which is capable of attaining a higher speed in its start-up for sound reproduction, even though simple in construction, with the pickup being moved in advance to a prescribed position on the reproduced side of the disk prior to the completion of the operation for setting the disk in place at the time of a disk operation for sound reproduction therefrom.

Another object of the present invention to provide a disk player which is capable of attaining a higher speed in its start-up for sound reproduction, even though simple in construction, with the pickup being moved in advance to the position for the start of the operation for reading the disk, with reference to the respective types of the individual types kept in memory in advance, prior to the completion of the operation for setting the disk in place at the time of a disk operation for sound reproduction therefrom.

In order to attain the object described above, a disk player which stores a plural number of disks different in type in a sub-tray storing part and transports the disk by a transporting unit between the sub-tray storing part and a player part provided with a pickup transport mechanism for reproducing recorded sound on both sides of a disk with a single pickup, comprises an instructing unit for instructing the selection of a disk stored in the sub-tray storing part and instructing the reproduction of a disk with the player part and a control unit for moving the pickup in the player part to a prescribed position on the reproduced side of the selected disk in accordance with the reproduced side of the disk selected by the instructing unit.

The disk player according to the present invention is capable of moving the pickup in the player part to the position for the start of the recorded signals on the reproduced side of the disk prior to a reproducing operation when the instructing means has given instructions for the selection of a disk and instructions for reproduction of recorded sound from the selected disk.

Accordingly, the disk player according to the present invention does not need any sensor for detecting the type of a disk.

Also, even when a plural number of various types of disks different in diameter, such as CDs and LDs, are stored, the disk player according to the present invention is capable of keeping the pickup in its stand-by state in a predetermined position on the reproduced side of each disk, so that the duration of time needed for the transport of the pickup between the side A and the side B of the disk is not added onto the start-up time in case the disk player is constructed in such a manner that both sides of a disk are to be reproduced with a single pickup.

In order to attain the second object described above, a disk player which stores a plural number of disks different in type in a sub-tray storing part and transports the disk, by a transporting unit, between the sub-tray storing part and a player part for reproducing a disk, comprises a memory unit for storing the types of the disks to be stored in the sub-tray storing part; an instructing unit for instructing to select a disk stored in the sub-tray storing part and instructing the reproduction of a disk with the player part; and a control unit for moving the pickup in the player part to the starting position of the recorded signals on the disk after determining the type of the disk selected by this instructing unit, referring to the information stored in the memory unit.

The disk player according to the present invention is capable of storing in advance the types of disks to be stored in the sub-tray storing part in a memory unit and moving the pickup in the player part in advance to the position for the start of the recorded signals on the reproduced disk prior to the completion of the operation for setting the selected disk by determining the type of the selected disk with reference to the information stored in the memory unit when the instructing unit has given instructions for the selection of a disk and instructions for the reproduction of recorded sound from the selected disk.

Accordingly, the disk player according to the present invention does not need any sensor for detecting the type of a disk.

Therefore, the disk player according to the present invention is capable of accepting the input of the types of disks, for example, by manual input operation, and, in such a case, the disk player will not be in need of any sensor for detecting the types of disks.

Also, even when a plural number of various types of disks different in diameter, such as CDs and LDs, are stored, the disk player according to the present invention is capable of keeping the pickup in its stand-by state in the position for the start of the recorded signals on each disk and therefore does not require any such series of sequential operations as those necessary for the disk discriminating method based on focus lock-in as in practice in the conventional method.

DETAILED DESCRIPTION OF THE PREFERRED EMBODIMENTS

Now, the details of preferred embodiments of the present invention will be described below with reference to the accompanying drawings, in which the same reference marks are used to designate those parts used in common with the construction shown in FIG. 1 and duplications in the description of those parts are avoided.

Figure 5:
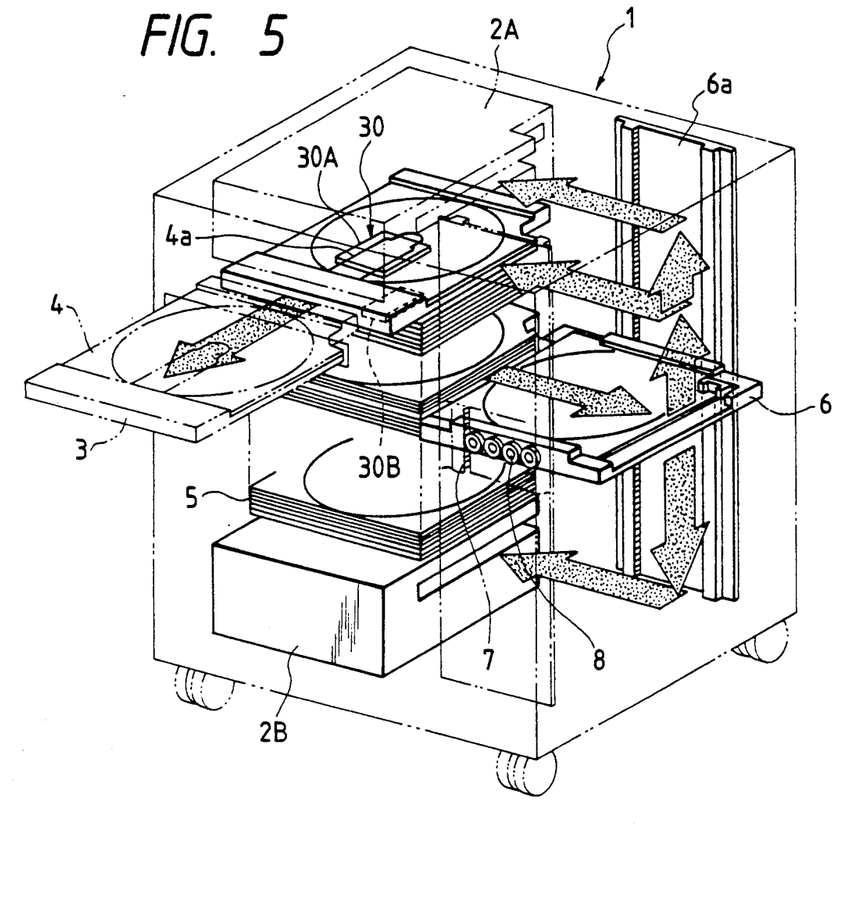
FIG. 5 is a perspective view illustrating one example of preferred embodiment of the disk player according to the present invention.
Figure 13:
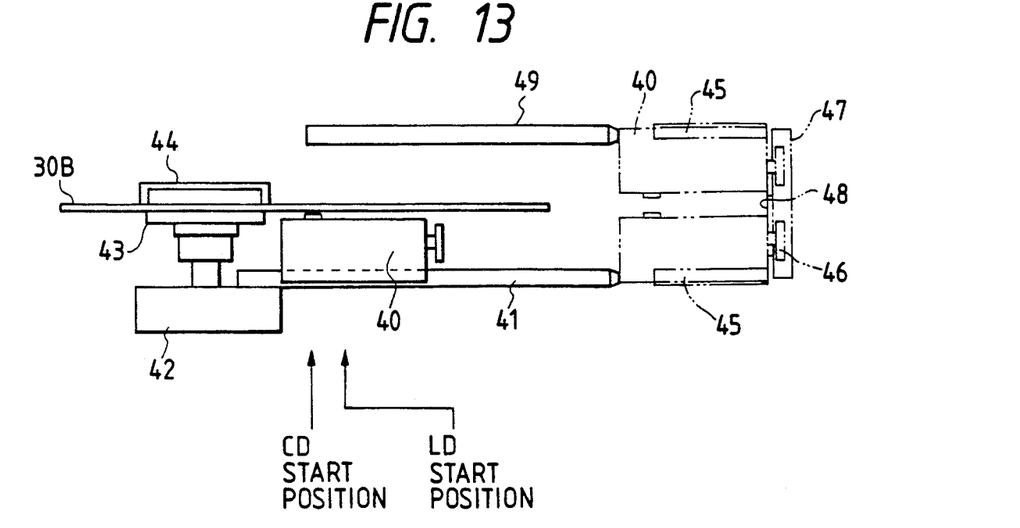
FIG. 13 is a side view for illustrating a description of the start-up position of a CD or an LD with the pickup in the disk player in FIG. 5.

FIG. 5 illustrates one example a preferred embodiment of the disk player according to the present invention, and the disk player is provided with disk reproducing parts 2A and 2B respectively formed in the upper and lower areas on one side of the inside region of the housing 1. The pickup installed on each of the disk reproducing parts 2A and 2B is a single pickup as illustrated in FIG. 13, which is described below.

A main tray 3 is provided in a manner permitting its forward and backward movement at a point in the proximity of the upper end part of the housing 1. The main tray 3 is provided with sub-trays 4 constructed in such a manner as to permit their respective free movement in the direction crossing at right angles with the direction of the forward and backward movement of this main tray 3. Then, when the main tray 3 has been retracted into the inside region of the housing 1, the sub-trays 4 are accommodated in the area below the lower surface of the disk reproducing part 2A.

Figure 6:
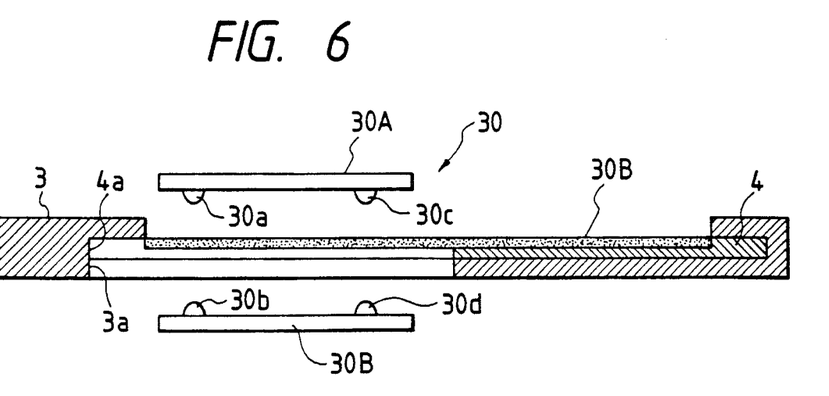
FIG. 6 is a sectional view illustrating a description of the state of arrangement of the optical sensors in the disk player shown in FIG. 5.

Below the lower surface of the disk reproducing part 2A, optical disk type detecting sensors 30 (hereinafter referred to as "sensors") provided with a light receiving part 30A and a light emitting part 30B, are arranged in a state in which the main tray 3 is positioned between them, as shown in FIG. 6, and the light receiving part 30A and the light emitting part 30B are respectively provided with light receiving elements 30a and 30c and light emitting elements 30b and 30d. The relative positions of a disk, which is set in a sub-tray 4 installed in such a manner that the sub-tray 4 may move freely, and the optical sensor 30 are in the relationship shown in FIG. 7.

Figure 7:
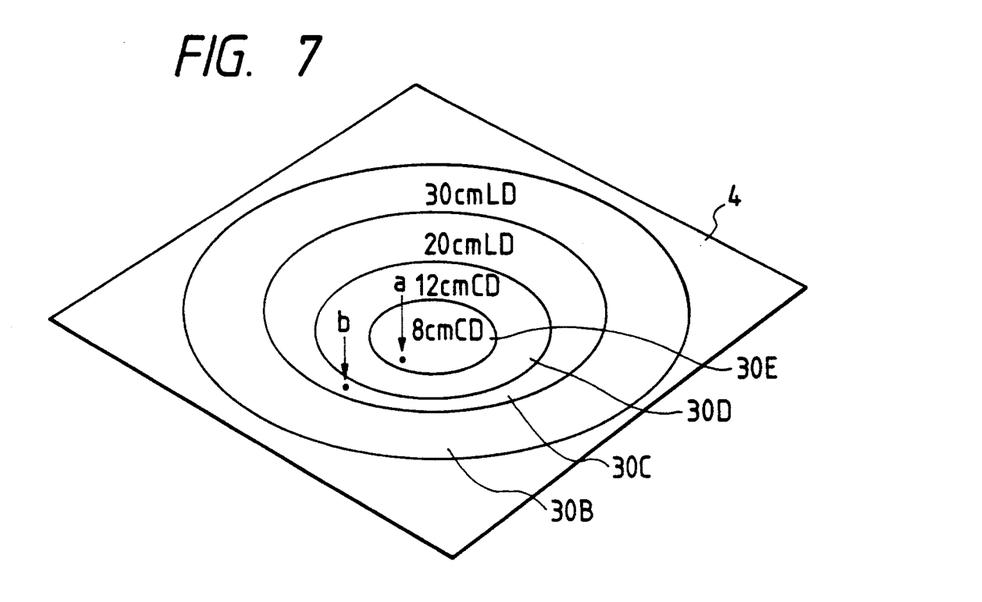
FIG. 7 is a perspective view illustrating the relative positions in relationship between the light emitting elements and light receiving elements in the optical sensors shown in FIG. 6 and different types of disks.
Figure 8:
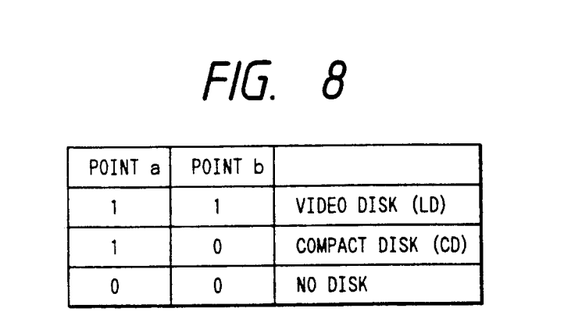
FIG. 8 is a chart presenting the tabulated truth values as determined in light of the results of detections by the optical sensors shown in FIG. 6.

That is to say, the light receiving element 30a and the light emitting element 30b are arranged so as to be positioned 15 respectively above and below a point a on the periphery of the outer circumference of the CD 30E having a diameter of 8 cm while the light receiving element 30c and the light emitting element 30d are arranged in such a way as to be positioned respectively above and below a point b on a video disk 30C having a diameter of 20 cm.

Then, the light emitted from the light emitting part 30B reaches the light receiving part 30A, passing through the clamping hole 4a formed in the sub-tray 4 and a hole 3a made in correspondence with the clamping hole 4a. Therefore, the logical values derived from the results of detections by the optical sensor 30 will be in four sets, which are (1, 1) indicating the presence of a video disk, (1, 0) indicating the presence of a compact disk, (0, 0) indicating the absence of a disk), and (0, 1) indicating "ignore". Moreover, the light emitting parts 30B and 30D indicate an LD having a diameter of 30 cm and a CD having a diameter of 12 cm, respectively.

Between the disk reproducing parts 2A and 2B positioned above and below, a sub-tray storing part 5 is provided in order to move the sub-trays 4 with or without disks placed in them freely forward and backward in the horizontal direction and to store them in layers.

On the other side of the inside region of the housing 1, a space is provided to allow the movement of a transporting member 6, which transports a sub-tray 4.

The positioning of the transporting member 6 in the upward and downward direction along the guide member 6a is effected by counting a plural number of slits made in a member extending along the direction of movement of the transporting member 6 every time a photo-sensor installed on the transporting member 6 passes across the slits and stopping the movement of the transporting member 6 at the point in time when the count value agrees with the specified address.

Figure 9:
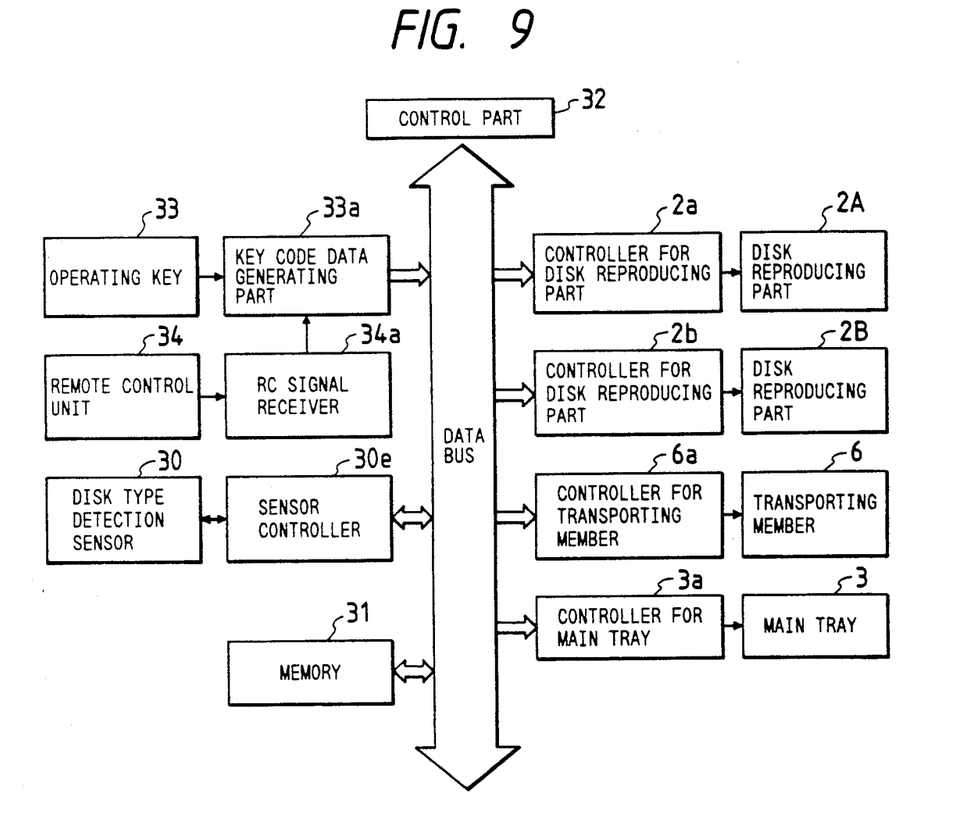
FIG. 9 is a block diagram illustrating the control system for the disk player shown in FIG. 5.

FIG. 9 illustrates a control system for controlling the operations of the disk player shown in FIG. 5, and this control system is comprised of a disk reproducing part controllers 2a and 2b, a transporting member controller 6a, a main tray controller 3a, a key cord generating part 33a, a sensor controller 30e, and a memory 31 connected via respective data buses with a control part 32, which operates to control the operations of the individual component elements.

The disk reproducing part 2A, the disk reproducing part 2B, the transporting member 6, the main tray 3, and the disk type detecting sensor 30 are driven in accordance with control signals generated respectively from the disk reproducing part controllers 2a and 2b, the transporting member controller 6a, the main tray controller 3a, and the sensor controller 30e.

The key cord generating part 33a generates key cord data in correspondence with the instructing mode of the remote control signal light receiving part 34a, which receives the remote control signals generated by operations on the operating keys 33 or the remote control (RC) unit 34a.

The memory 31 stores the address data and the information by the types of disks in correspondence with the storing positions of the individual disks in the sub-tray storing part 5.

Figure 10:
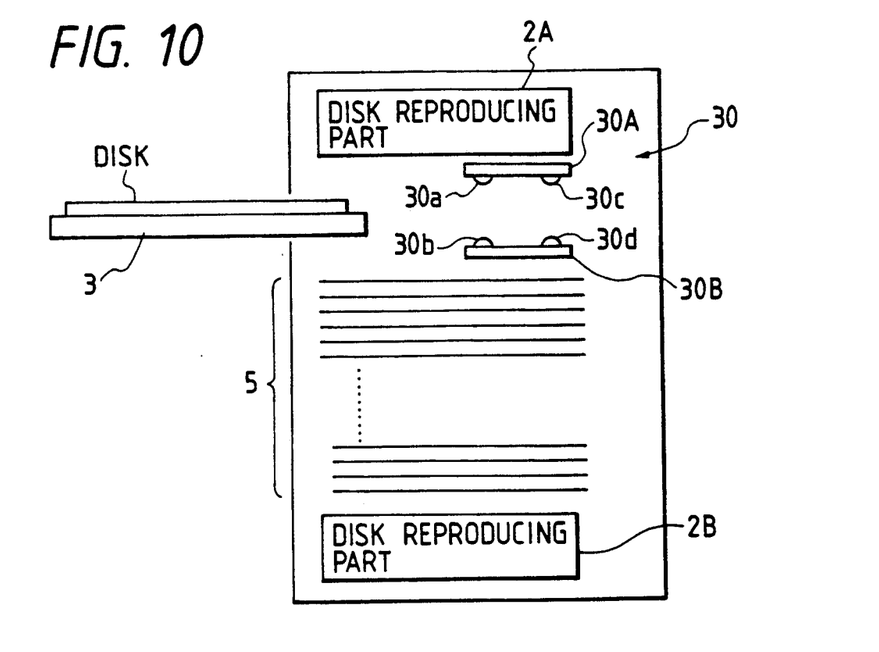
FIG. 10 is a chart illustrating the operations of the disk player shown in FIG. 5.
Figure 11:
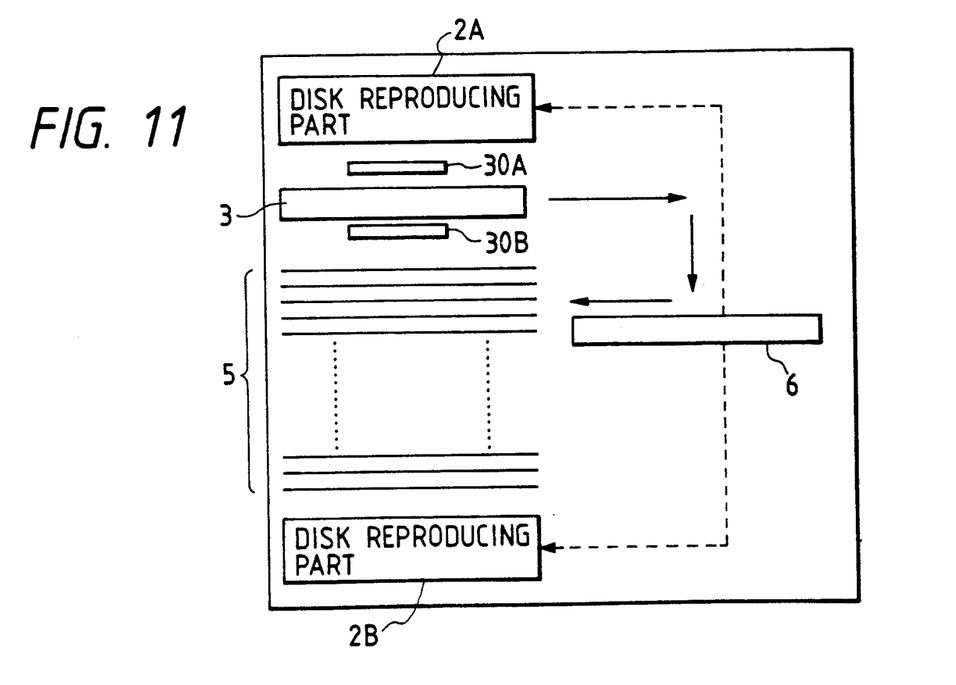
FIG. 11 is a chart illustrating the operations of the disk player shown in FIG. 5.
Figure 12:
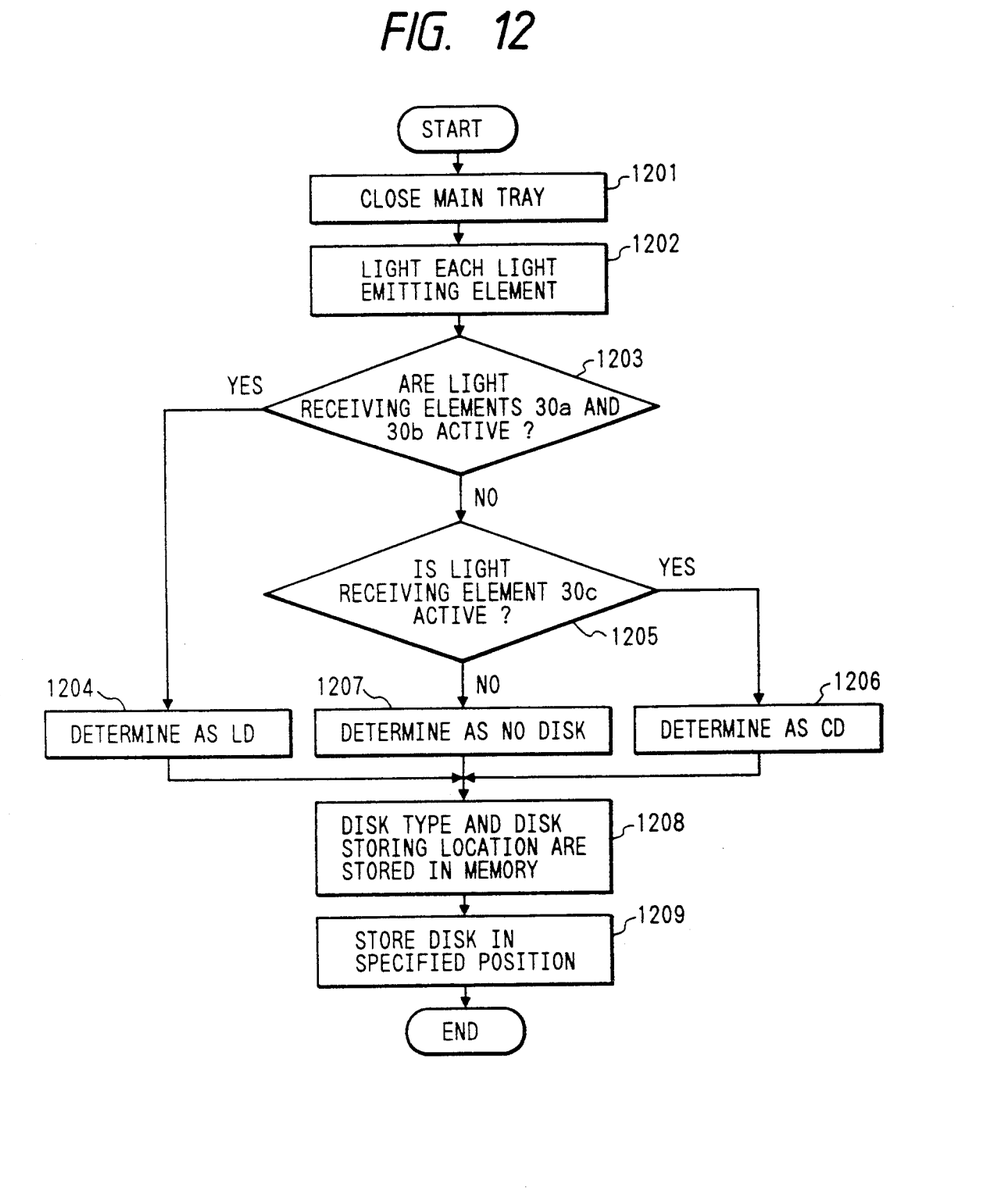
FIG. 12 is a flow chart for illustrating a description of the operations for storing the information in the memory at the time of the disk storing operation in the disk player shown in FIG. 5.

Next, the operations for storing a disk in the sub-tray storing part 5 will be described with reference to FIGS. 10 through 12.

First, when the main tray 3 is closed with a disk placed in the sub-tray 4 mounted on the main tray 3 in the state shown in FIG. 10, the main tray 3 will move into the area below the lower surface of the disk reproducing part 2A (at the step 1201). At this moment, the disk placed on the sub-tray 4 is positioned between the light receiving part 30A and the light emitting part 30B of the sensor 30.

Upon completion of the closing operation of the main tray 3, the optical sensor 30 is driven under control by the control part 32 (at the step 1202). By the driving operation applied to the sensor 30, the individual light receiving elements 30a and 30c at the side of the light receiving part 30A generate the results of their detection, and the type of the detected disk is determined on the basis of the results of such detection.

Specifically, when both of the light receiving elements 30a and 30c are active (at the step 1203), it is determined that the values are (1, 1) indicating the presence of a video disk at the step 1204, and, when none of the light receiving elements 30a and 30c are active, but only the light receiving element 30c is active at the step 1205, it is determined that the values are (1, 0) indicating the presence of a compact disk (at the step 1206). When both of the light receiving elements 30a and 30c are passive, it is determined that the values are (0, 0) indicating no disk (at the step 1207).

On the basis of the results of such a determination, the control part 32 instructs the memory 31 to store the address corresponding to the storing position of the disk in the sub-tray storing part 5 as well as the information by the disk type (at the step 1208).

When the operation for the storage of the information in the memory 31 is completed, a sub-tray 4 containing a disk is accommodated in a predetermined position in the sub-tray storing part 5 by the transporting operation performed by the transporting member 6 as mentioned above (at the step 1209).

When the operation for storing the sub-tray 4 is thus completed, the main tray 3 will be in an empty state, and it is then made possible to store another disk when the transporting member 6 pulls out another sub-tray 4 from the sub-tray storing part 5 and delivers the sub-tray 4 to the main tray 3.

Moreover, in case a disk already stored in the sub-tray storing part 5 is to be replaced, the memory 31 stores the address corresponding to the storing position of the disk in the sub-tray storing part 5, as well as the information on the disk by its disk type, by the same procedure as that described above. In this case, the memory 31 is designed in such a way that new information is written to it by overwriting the current address stored in it.

Figure 14:
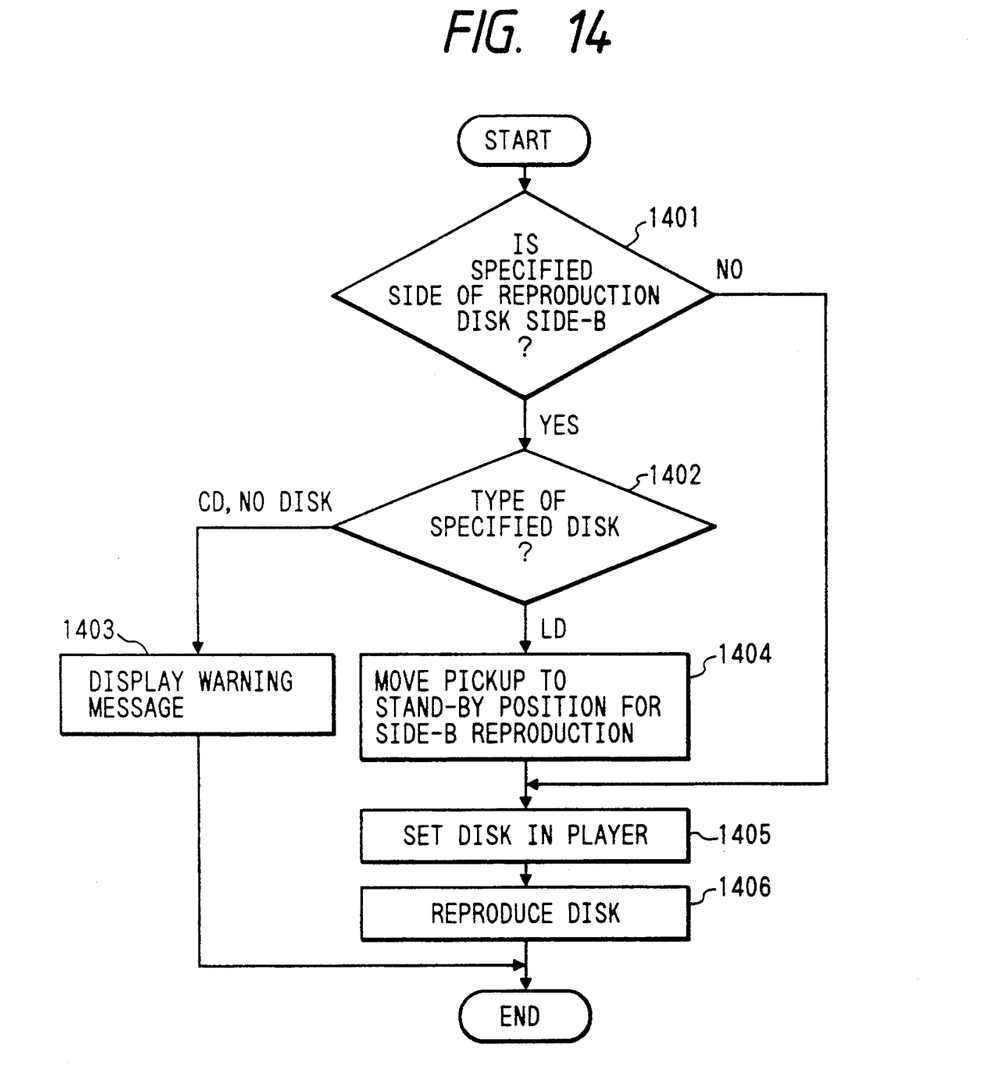
FIG. 14 is a flow chart for illustrating operations of the disk player of first embodiment at the time of the reproduction of a disk.

Subsequently, a description is made of the operation for the reproduction of a disk with reference to FIG. 13 and FIG. 14. First, when the disk number, the disk side, and the music piece number are specified by operations on the operating keys 33 or the RC unit 34, the specified side of the disk is determined (at the step 1401). In case it is determined that the specified side of the disk is the side A, the specified disk is transported to the disk reproducing part 2A or to the disk reproducing part 2B by the transporting member 6. Then, the disk thus transported to the disk reproducing part 2A or to the disk reproducing part 2B is held set between a turntable 43 of a spindle motor 42 (at the step 1405) and is then driven to attain a prescribed number of revolutions by the driving force exerted by the spindle motor 42, immediately after which a reproducing operation is performed on the disk (at the step 1406).

On the other hand, in case it is determined (at the step 1401) that the specified side of the disk is the side B, the type of the disk is determined on the basis of the information stored in the memory 31 (at the step 1402). In case it is determined that the type of the disk is a CD or that there is no disk in place, a warning message is displayed on a display unit (omitted from the illustrations in the drawings) at the step 1403. In this regard, the means of giving warning messages are not to be limited to this, but such methods as flashing a display lamp or sounding a buzzer may be employed.

In contrast to this, when it is determined that the detected disk is an LD, the pickup 40 moves along a guide shaft 41 to the side of a retaining member 45 provided apart from this guide shaft 41. A planetary gear 46 moves upward, rotating on the periphery of the outer circumference of a sun gear 47 as the sun gear 47 rotates. The rotating member 48, which is connected to the planetary gear 46, and the retaining member 45, which is installed on an end part of this rotating member 48, move upward in rotation along with the movement of the planetary gear 46. This movement sets the pickup 40, which is held on the retaining member 45, into its upward rotation 8 (at the step 1404). This movement determines the stand-by position for the pickup for the reproduction of the side B of the LD. From this position, the pickup 40 moves to the side of the guide shaft 49 via the retaining member 45 and moves farther to the position for the start of the recorded signals on the LD.

Moreover, the stand-by position for the pickup 40 thus determined may be alternatively set, for example, in the intermediate position in the rotating motion to be performed by the pickup in the upward and downward directions. In such a case, the rotating distance in the upward and downward directions can be shortened.

Next, the disk which has been transported to the disk reproducing part 2A or the disk reproducing part 2B is held as set between the turntable 43 of the spindle motor 42 and the clamper 44 (at the step 1405) and the reproduction of the disk is performed immediately after the disk has attained a predetermined number of revolutions by the driving force exerted by the spindle motor 42 (at the step 1406) since the pickup 40 has already moved to the position for the start of the recorded signals on the LD.

Then, upon completion of reproduction of the selected piece of music on the side B of the LD, the pickup 40 moves to its stand-by position at the side of the retaining member 45 along the guide shaft 49 and will remain in the stand-by position.

When the side to be reproduced on the next disk is the side A while the pickup 40 is in this state, the pickup 40 will move to the position for the start of the recorded signals on the side A in the same manner of operation as that described above before the disk is set in place.

In this manner, the disk player in this example of preferred embodiment of the present invention can determine the type of an LD or a CD by means of the optical sensor 30 when the disks are accommodated in regular sequence in the sub-tray storing part 5 and can also store the disk type thus determined as set in correspondence with the address indicating the storing position of the detected disk in regular sequence in the memory 31. At the time of the reproduction of a disk, this disk player first determines the specified side of a disk when the disk number, the disk side, and the music piece number are specified by operations on the operating keys 33 or on the RC unit 34 and moves the pickup to the position for the start of the recorded signals on the reproduced side of the disk to be reproduced before the disk is held (set) between the turntable 43 of the spindle motor 42 and the clamper 44. Thus, this disk player is therefore capable of performing the start-up operation of each disk promptly even in case different types of disks, namely, either CDs or LDs varying in size and further even in case the side B of an LD is specified for reproduction.

Furthermore, the present invention has been described in this example of preferred embodiment in which the present invention is applied to a disk player which is provided with a main tray 3 installed in such a manner as to permit the main tray 3 freely to move forward and backward in relation to the housing 1. It should be understood, however, that the present invention is not limited to these examples of its embodiment, but may be applied effectively to such other forms of its embodiment as a disk player of the type in which the replacement of a disk is to be performed by manual operation with the door of the housing 1 kept open.

In such a case, the type of the disk and the address as set in correspondence with the storing position of the disk are to be stored in the memory 31 by manual input operation at the time of the replacement of a disk.

Figure 15:
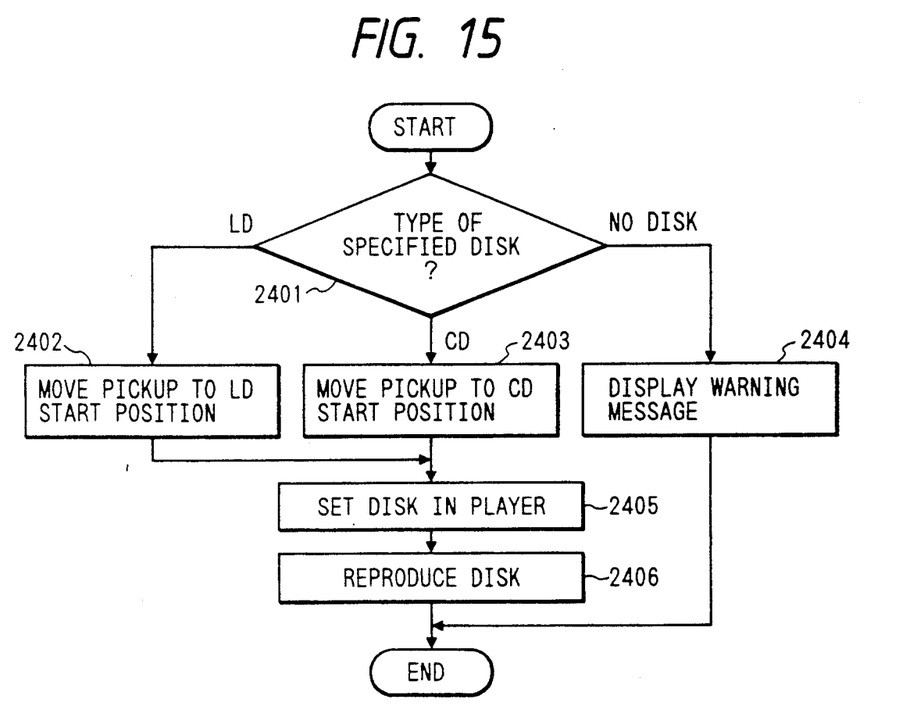
FIG. 15 is a flow chart for illustrating operations of the disk player of second embodiment at the time of the reproduction of a disk.

Next, an operation for the reproduction of a disk according to the second embodiment will be described with reference to FIG. 13 and FIG. 15. First, when the disk number, the disk side, and the music piece number are specified by operations on the operating keys 33 or the RC unit 34, the type of the selected disk is determined on the basis of the information stored in the memory 31 (at the step 2401). In case it is determined that the type of the specified disk is an LD, the pickup 40 is transported to the start-up position of the LD in the direction of the radius along the guide shaft 41 (at the step 2402).

In case it is determined that the type of the specified disk is a CD in the same manner of operation as described above, a warning message is indicated (at the step 2404) on a display unit which, (though not shown in the drawings) is installed on the surface side of the housing 1. The type of the disk is determined on the basis of the information stored in the memory 31 (at the step 2402). In this regard, the means of giving warning messages are not to be limited to the process shown in this preferred embodiment, but other methods such as flashing a display lamp or sounding a buzzer may be employed.

When either an LD or a CD is held set between the turntable 43 of the spindle motor 42 and the clamper 44 (at the step 2405), the reproduction of the disk is performed (at the step 2406) immediately after the disk has attained a predetermined number of revolutions by the driving force exerted by the spindle motor 42.

In this manner, the disk player in this example of preferred embodiment of the present invention can determine the type of an LD or a CD by means of the optical sensor 30 when the disks are accommodated in regular sequence in the sub-tray storing part 5 and can also store the disk type thus determined as set in correspondence with the address indicating the storing position of the detected disk in regular sequence in the memory 31. At the time of the reproduction of a disk, this disk player is capable of promptly performing the start-up operation of each disk even in case any of different types of disks, namely, either CDs or LDs varying in type and therefore varying in the position for the start of the recorded signals, because this disk player is designed to move the pickup to the position for the start of the recorded signals on the disk to be reproduced before the disk is held (set) between the turntable 43 of the spindle motor 42 and the clamper 44.

Furthermore, the present invention has been described in this example of a preferred embodiment in which the present invention is applied to a disk player provided with a main tray 3 installed in such a manner as to be capable of freely moving forward and backward in relation to the housing 1. It should be understood, however, that the present invention is not limited to these examples, but may be applied effectively to such other forms of its embodiment as a disk player of the type in which the replacement of a disk is to be performed by manual operation with the door of the housing 1 kept open.

In such a case, the type of the disk and the address as set in correspondence with the storing position of the disk are to be stored in the memory 31 by manual input operation at the time of the replacement of a disk.

As described hereinabove, the disk player according to the present invention is capable of moving the pickup to the position of the start of the recorded signals on the disk side for reproduction in advance when instructions for selection of a disk and instructions for reproduction of the disk have been given by the instructing means.

Therefore, the disk player according to the present invention can store the types of disks in the memory by manual input operation and can therefore operate without any sensor for detecting the types of disks.

Moreover, even in case a plural number of different types of disks varying in diameter, such as CDs and LDs, are stored in the sub-tray storing part, the disk player according to the present invention is capable of causing the pickup to stand by in the prescribed position on the reproduced side of each disk and is therefore capable of achieving a higher speed in the start-up of its operations for the reproduction of a disk because the duration of time necessary for the pickup to move between the side A and the side B of a disk is not added to the start-up time in case the disk player is in such a construction in which either of both sides of a disk is to be traced with a single pickup for its reproduction.

Furthermore, the disk player according to the present invention is capable of storing a memory means in advance with information on the types of disks to be stored in the sub-tray storing part and moving the pickup in the disk reproduction part to the position of the start of the recorded signals on the selected disk prior to the completion of the operation for setting the selected disk, determining the type of the selected disk with reference to the information stored in the memory means, when the instructing means has given instructions for selection of a disk and instructions for reproduction of the disk.

Therefore, the disk player according to the present invention can store the types of disks in the memory by manual input operation and can therefore operate without any sensor for detecting the types of disks and can accordingly operate without sensors and the component parts accessory to sensors, thereby achieving a simplified construction.

Moreover, even in case a plural number of disks varying in their types, such as CDs and LDs, and are therefore different in the position for the start of the recorded signals are stored in the sub-tray storing part, the disk player according to the present invention is capable of causing the pickup to stand by in the position for the start of the recorded signals on each disk in advance of the completion of the loading operation for each disk and is therefore capable of achieving a higher speed in the start-up of its operations for the reproduction of a disk because the disk player does not need the series of sequential operations needed in the method of discriminating the disks by focus lock-in, which is employed in the conventional disk discriminating process.

What is claimed is:

1. A disk player comprising:
   a housing;
   a plurality of sub-trays, each of which carries a disk;
   a storing section, disposed within said housing, for storing a stack of said plurality of sub-trays;
   a disk reproducing means comprising a pick-up transport ember and a single pick-up member disposed in said housing, and means for receiving a disk and means for reproducing up to two sides of said disk;
   transporting means for transporting a selected sub-tray between said storing section and said disk reproducing means;
   memory means for storing address data corresponding to a storing position for each of said disks carried in said sub-trays and to types of said disks;
   instructing means for instructing said transporting means to select and transport one of said plurality of sub-trays including a disk from said storing section to said disk reproducing means, for instructing said reproducing means to reproduce said selected disk, and for instructing said pickup members; and
   control means, coupled to said memory means and said instructing means, for moving said pickup members of said disk reproducing means to a predetermined position at a reproduction side of said selected disk for reproduction thereof, in accordance with the data stored in said memory means and instructions produced by said instructing means.

2. A disk player as claimed in claim 1, wherein said instructing means specifies a disk number, disk side, and music piece number to be reproduced.

3. A disk player as claimed in claim 1, further comprising means for exchanging said sub-trays, said sub-tray exchanging means having a main-tray formed in said housing, said main-tray being movable in and out of said housing; and means for detecting a type of said disk to be reproduced.

4. A disk player comprising:
a housing;
a plurality of sub-trays, each of which carries a disk;
a storing section, disposed within said housing, for storing a stack of said plurality of sub-trays;
a disk reproducing means comprising a pick-up transport ember and a single pick-up member disposed in said housing, and means for receiving a disk and means for reproducing up to two sides of said disk;
transporting means for transporting a selected sub-tray between said storing section and said disk reproducing means;
memory means for storing data representative of types of disks stored in each of said sub-trays in said storing section;
instructing means for instructing said transporting means to select and transport one of said plurality of sub-trays including a disk from said storing section to said disk reproducing means, for instructing said reproducing means to reproduce said selected disk, and for instructing said pickup members; and
control means, coupled to said memory means and said instructing means, for moving said pickup members of said disk reproducing means to a start-up position of said selected disk for reproduction thereof, after determining the type of the disk selected by said instructing means in accordance with the data stored in said memory means and instructions produced by said instructing means.

5. A disk player as claimed in claim 4, wherein said instructing means specifies a disk number, disk side, and music piece number to be reproduced.

6. A disk player as claimed in claim 4, further comprising means for exchanging said sub-trays, said sub-tray exchanging means having a main-tray formed in said housing, said main-tray being movable in and out of said housing; and means for detecting a type of said disk to be reproduced.

7. A disk player comprising:
a housing;
a plurality of sub-trays, each of which carries a disk;
a storing section, disposed within said housing, for storing a stack of said plurality of sub-trays;
a disk reproducing means comprising a pick-up transport member and a single pick-up member disposed in said housing, and means for receiving a disk and means for reproducing up to two sides of said disk;
transporting means for transporting a selected sub-tray between said storing section and said disk reproducing means;
memory means for storing address data corresponding to a stored in each of said sub-trays in said storing section and address data corresponding to a stored position of said disks;
instructing means for instructing said transporting means to select and transport one of said plurality of sub-trays including a disk from said storing section to said disk reproducing means, for instructing said reproducing means to reproduce said selected disk, and for instructing said pickup members; and
control means, coupled to said memory means and said instructing means, for moving said pickup members of said disk reproducing means to a predetermined position at a reproduction side of said selected disk for reproduction thereof, after determining the type of the disk selected in accordance with the data stored in said memory means and instructions produced by said instructing means, said predetermined position being a start-up position of said selected disk.

8. A disk player as claimed in claim 7, wherein said predetermined position is one of a compact disk reproduction starting position and a video disk reproduction starting position.

9. A disk player as claimed in claim 7, further comprising means for exchanging said sub-trays, said sub-tray exchanging means having a main-tray formed in said housing, said main-tray being movable in and out of said housing; and means for detecting a type of said disk to be reproduced.

* * * * *